United States Patent
Umemura et al.

(10) Patent No.: US 10,914,574 B2
(45) Date of Patent: Feb. 9, 2021

(54) THREE-DIMENSIONAL MEASUREMENT DEVICE

(71) Applicant: CKD CORPORATION, Aichi (JP)

(72) Inventors: Nobuyuki Umemura, Aichi (JP); Tsuyoshi Ohyama, Aichi (JP); Norihiko Sakaida, Aichi (JP)

(73) Assignee: CKD CORPORATION, Aichi (JP)

( * ) Notice: Subject to any disclaimer, the term of this patent is extended or adjusted under 35 U.S.C. 154(b) by 57 days.

(21) Appl. No.: 16/538,934

(22) Filed: Aug. 13, 2019

(65) Prior Publication Data

US 2019/0360798 A1 Nov. 28, 2019

Related U.S. Application Data

(63) Continuation of application No. PCT/JP2017/030703, filed on Aug. 28, 2017.

(30) Foreign Application Priority Data

Mar. 2, 2017 (JP) .................. 2017-039311

(51) Int. Cl.
G01B 11/25 (2006.01)
G01N 21/88 (2006.01)
G01N 21/956 (2006.01)

(52) U.S. Cl.
CPC ......... G01B 11/25 (2013.01); G01N 21/8806 (2013.01); G01N 21/956 (2013.01)

(58) Field of Classification Search
CPC .............. G01B 11/25; G01B 11/2527; G01N 21/8806; G01N 21/956

(Continued)

(56) References Cited

U.S. PATENT DOCUMENTS

2015/0300816 A1  10/2015  Yang et al.

FOREIGN PATENT DOCUMENTS

JP  2006-292385 A   10/2006
JP  2013-120093 A    6/2013

(Continued)

OTHER PUBLICATIONS

Notification of Reasons for Refusal issued in corresponding Japanese Application No. JP2017-039311 dated Feb. 20, 2018 (10 pages).

(Continued)

*Primary Examiner* — Tri T Ton
(74) *Attorney, Agent, or Firm* — Osha Bergman Watanabe & Burton LLP

(57) ABSTRACT

A three-dimensional measurement device includes: a projector that includes: a light source that emits predetermined light; and a reflective optical modulator that converts the predetermined light into a predetermined striped pattern, wherein the projector projects the predetermined striped pattern onto a measurement object at a predetermined number of frames per unit time; an imaging device that takes an image of the measurement object projected with the predetermined striped pattern; a processor that: controls the projector and the imaging device to sequentially project a plurality of different ones of the predetermined striped pattern and take images of the plurality of different ones of the predetermined striped pattern to obtain a plurality of image data having different light intensity distributions; and executes three-dimensional measurement of the measurement object based on the plurality of image data.

8 Claims, 7 Drawing Sheets

(58) Field of Classification Search
USPC ..... 356/237.1–237.6, 239.1–239.8, 600–640
See application file for complete search history.

(56) References Cited

FOREIGN PATENT DOCUMENTS

| JP | 2014-032159 A | 2/2014 |
| JP | 2025-001381 A | 1/2015 |
| WO | 2015/125403 A1 | 8/2015 |

OTHER PUBLICATIONS

Written Opinion of the International Searching Authority issued in corresponding International Application No. PCT/JP2017/030703 dated Nov. 21, 2017 (6 pages).
International Search Report issued in corresponding International Application No. PCT/JP2017/030703 dated Nov. 21, 2017 (5 pages).
International Preliminary Report on Patentability issued in corresponding International Application No. PCT/JP2017/030703, dated Sep. 3, 2019, with translation (17 pages).

THREE-DIMENSIONAL MEASUREMENT DEVICE

BACKGROUND

Technical Field

The present invention relates to a three-dimensional measurement device configured to perform three-dimensional measurement by using a phase shift method or the like.

Description of Related Art

In a general production line for mounting electronic components on a printed circuit board, solder paste is printed first at predetermined positions on the printed circuit board (solder printing process). An adhesive is then applied at predetermined positions on the printed circuit board (adhesive application process). The electronic components are subsequently mounted on the printed circuit board (mounting process). In this state, the electronic components are temporarily fixed by the viscosity of the solder paste or by the adhesive. The printed circuit board is subsequently introduced into a reflow furnace to be subjected to soldering (reflow process).

In such a production line, a substrate inspection apparatus or the like is provided to inspect the printing state of the solder paste or the application state of the adhesive, for example, prior to mounting of the components. Various three-dimensional measurement devices have conventionally been proposed as the substrate inspection apparatus. Among them, well-known three-dimensional measurement devices use a phase shift method.

The three-dimensional measurement device using the phase shift method is provided with a light source configured to emit predetermined light and with a projection unit comprised of, for example, a grating to convert the light emitted from the light source into a predetermined striped pattern. The three-dimensional measurement device is configured to project the striped pattern onto a measurement object by the projection unit.

The three-dimensional measurement device then uses an imaging unit (imaging device) that is placed immediately above the measurement object to take an image of the striped pattern projected on the measurement object. The imaging unit used may be, for example, a CCD camera comprised of lenses and imaging elements.

In the configuration described above, intensity (luminance) I of light in each of pixels on image data taken and obtained by the imaging unit is given by an expression (U1) given below:

$$I = f \cdot \sin \phi + e \quad \text{(U1)}$$

where f denotes a gain, e denotes an offset, and $\phi$ denotes a phase of a striped pattern.

The three-dimensional measurement device sequentially changes the position of the above grating to shift the phase of the striped pattern four times by, for example, 90 degrees each ($\phi+0$, $\phi+90$ degrees, $\phi+180$ degrees, and $\phi+270$ degrees) and takes images under the respective striped patterns having the different phases.

This provides image data that are taken under the respective striped patterns having the different phases and that have intensity distributions $I_0$, $I_1$, $I_2$ and $I_3$. The phase $\phi$ is then determinable according to Expression (U2) given below:

$$\phi = \tan^{-1}[(I_1 - I_3)/(I_2 - I_0)] \quad \text{(U2)}$$

A height (Z) at each coordinates (X, Y) on the measurement object may be determined by using this phase $\phi$, based on the principle of triangulation.

In general, in the three-dimensional measurement device using the phase shift method, a striped pattern having a light intensity distribution of a sinusoidal waveform is projected, with a view to increasing the measurement accuracy. It is, however, very difficult to project a striped pattern having a light intensity distribution of a highly accurate, ideal sinusoidal waveform.

By taking into account these circumstances, recently proposed three-dimensional measurement devices use a digital micromirror device (hereinafter referred to as "DMD") to project a striped pattern (as described in, for example, Patent Literature 1).

Using the DMD allows for the more accurate expression of intermediate tones of a striped pattern. This enables the projected striped pattern to have a light intensity distribution close to an ideal sinusoidal waveform and thereby improves the measurement accuracy.

PATENT LITERATURE

Patent Literature 1: JP 2015-1381A

The DMD, however, changes the duty ratio in one frame (for example, 1/60 seconds) with respect to each pixel to express the light having a desired luminance value in the unit of frame (as shown in FIG. 4).

Accordingly, as shown in FIG. 8, when an imaging process (exposure process) of taking an image of a predetermined striped pattern (for example, pattern 1) is started or terminated in the middle of a one frame period during a projection period for a predetermined number of frames with regard to the predetermined striped pattern, the luminance values of light (tone values corresponding to the duty ratio) expressed by the respective pixels of the DMD in the unit of a frame may fail to be appropriately reflected on image data obtained by the imaging unit. This is likely to reduce the measurement accuracy in three-dimensional measurement.

SUMMARY

One or more embodiments of the present invention provide a three-dimensional measurement device configured to suppress reduction of measurement accuracy in three-dimensional measurement.

The following describes embodiments of the present invention. Functions and advantageous effects that are characteristic of one or more embodiments are also described as appropriate.

Aspect 1. According to one or more embodiments, there is provided a three-dimensional measurement device. This three-dimensional measurement device comprises a projection unit provided with a light source configured to emit predetermined light and with a reflective optical modulator (for example, DMD) configured to convert the light emitted from the light source into a predetermined striped pattern, the projection unit being configured to project the striped pattern onto a measurement object at a predetermined number of frames per unit time (for example, at 60 frames per second); an imaging unit configured to take an image of at least the measurement object which the striped pattern is projected onto; an image obtaining unit configured to control the projection unit and the imaging unit and sequentially project a plurality of different striped patterns and take images of the plurality of different striped patterns, so as to obtain a plurality of different image data having different light intensity distributions; and an image processing unit configured to perform three-dimensional measurement of the measurement object, based on the plurality of different image data obtained by the image obtaining unit.

The reflective optical modulator is configured to have a two-dimensional arrangement of a plurality of pixels (for example, micromirrors), which are alternatively changeable between a first state (ON state) in which light entering from the light source is reflected to be projectable onto the measurement object and a second state (OFF state) that is different from the first state. The reflective optical modulator is configured to change a ratio of the first state of each of the pixels in one frame period and thereby generate the striped pattern.

When obtaining one image data out of the plurality of different image data, the image obtaining unit is configured to perform an imaging process that sequentially takes images (performs exposure) during a predetermined period that includes at least a striped pattern projection period for a predetermined number of frames with regard to one striped pattern among the plurality of different striped patterns. The image obtaining unit is configured: to set a full black pattern projection period for at least one frame in which a predetermined full black pattern is projectable, before and after the striped pattern projection period for the predetermined number of frames; and to start the imaging process during the full black pattern projection period before the striped pattern projection period for the predetermined number of frames and to terminate the imaging process during the full black pattern projection period after the striped pattern projection period for the predetermined number of frames.

The "full black pattern" herein means an optical image that has an entirely blackened projection area (provides a fully black projection area). In other words, in the case of projection of the "full black pattern", the entire projection area is not at all irradiated with light and has a luminance value of "0". Accordingly, in the "full black pattern projection period", the entire projection area is not at all irradiated with light over at least entire one frame period.

Even when the imaging process (exposure process) is performed in the "full black pattern projection period", no light enters the imaging unit and no electric charges are accumulated in the imaging elements in this period. Accordingly, the "full black pattern projection period" in which the predetermined full black pattern is projectable may be expressed as "non-projection period" in which no light is projected onto the measurement object.

A method employable to generate the "full black pattern" is, for example, a method of keeping all the pixels of the reflective optical modulator in the second state (OFF state) over entire one frame period, a method of turning off the light source, or a method of blocking out light by a separately provided shutter.

The configuration of the aspect 1 described above uses the reflective optical modulator, such as a DMD, to project a striped pattern onto the measurement object. This configuration provides image data of the higher accuracy that is to usable for three-dimensional measurement, compared with a prior art configuration that uses a grating or the like to project a striped pattern and take an image of the projected striped pattern.

Furthermore, the configuration of this aspect starts and terminates the imaging process during the full black pattern projection period. As described above, during the full black pattern projection period, no light enters the imaging unit, and no electric charges are accumulated in the imaging elements. This configuration accordingly allows for imaging (exposure) of only the light projected during the striped pattern projection period for the predetermined number of frames.

This configuration causes the luminance values of light (tone values corresponding to the duty ratio) expressed by the respective pixels of the reflective optical modulator in the unit of frames to be appropriately reflected on the image data obtained by the imaging unit. As a result, this configuration suppresses reduction of the measurement accuracy in three-dimensional measurement.

Aspect 2. According to one or more embodiments, there is provided another three-dimensional measurement device. This three-dimensional measurement device comprises a projection unit provided with a light source configured to emit predetermined light and with a reflective optical modulator configured to convert the light emitted from the light source into a predetermined striped pattern, the projection unit being configured to project the striped pattern onto a measurement object at a predetermined number of frames per unit time; an imaging unit configured to take an image of at least the measurement object which the striped pattern is projected onto; an image obtaining unit configured to control the projection unit and the imaging unit and sequentially project a plurality of different striped patterns and take images of the plurality of different striped patterns, so as to obtain a plurality of different image data having different light intensity distributions; and an image processing unit configured to perform three-dimensional measurement of the measurement object, based on the plurality of different image data obtained by the image obtaining unit.

The reflective optical modulator is configured to have a two-dimensional arrangement of a plurality of pixels, which are alternatively changeable between a first state in which light entering from the light source is reflected to be projectable onto the measurement object and a second state that is different from the first state. The reflective optical modulator is configured to change a ratio of the first state of each of the pixels in one frame period and thereby generate the striped pattern.

When obtaining one image data out of the plurality of different image data, the image obtaining unit is configured to perform an imaging process that sequentially takes images during a predetermined period that includes at least a striped pattern projection period for a predetermined number of frames with regard to one striped pattern among the plurality of different striped patterns. The image obtaining unit is configured to start the imaging process synchronously with a start timing of a first frame during the striped pattern projection period for the predetermined number of frames and to terminate the imaging process synchronously with an end timing of a last frame during the striped pattern projection period for the predetermined number of frames.

The configuration of the aspect 2 described above starts and terminates the imaging process synchronously with the changeover timing of the frames of the reflective optical modulator. As a result, this configuration provides similar functions and advantageous effects to those of the configuration of the aspect 1 described above.

Aspect 3. According to one or more embodiments, there is provided another three-dimensional measurement device. This three-dimensional measurement device comprises a projection unit provided with a light source configured to emit predetermined light and with a reflective optical modulator configured to convert the light emitted from the light source into a predetermined striped pattern, the projection unit being configured to project the striped pattern onto a measurement object at a predetermined number of frames per unit time; an imaging unit configured to take an image of at least the measurement object which the striped pattern is projected onto; an image obtaining unit configured to control the projection unit and the imaging unit and sequentially project a plurality of different striped patterns and take images of the plurality of different striped patterns, so as to obtain a plurality of different image data having different light intensity distributions; and an image processing unit configured to perform three-dimensional measurement of the measurement object, based on the plurality of different image data obtained by the image obtaining unit.

The reflective optical modulator is configured to have a two-dimensional arrangement of a plurality of pixels, which are alternatively changeable between a first state in which light entering from the light source is reflected to be projectable onto the measurement object and a second state that is different from the first state. The reflective optical modulator is configured to change a ratio of the first state of each of the pixels in one frame period and thereby generate the striped pattern.

When obtaining one image data out of the plurality of different image data, the image obtaining unit is configured to perform an imaging process that sequentially takes images during a predetermined period that includes at least a striped pattern projection period for a predetermined number of frames with regard to one striped pattern among the plurality of different striped patterns. The image obtaining unit is configured: to set a full black pattern projection period for at least one frame in which a predetermined full black pattern is projectable, at least one of before and after the striped pattern projection period for the predetermined number of frames; to start the imaging process during the full black pattern projection period before the striped pattern projection period for the predetermined number of frames or to start the imaging process synchronously with a start timing of a first frame during the striped pattern projection period for the predetermined number of frames; and to terminate the imaging process during the full black pattern projection period after the striped pattern projection period for the predetermined number of frames or to terminate the imaging process synchronously with an end timing of a last frame during the striped pattern projection period for the predetermined number of frames.

The configuration of the aspect 3 described above performs one of the start and the termination of the imaging process during the full black pattern projection period and performs the other synchronously with the changeover timing of the frames of the reflective optical modulator. As a result, this configuration provides similar functions and advantageous effects to those of the configurations of the aspect 1 and the aspect 2 described above.

Aspect 4. There is provided another three-dimensional measurement device. This three-dimensional measurement device comprises a projection unit provided with a light source configured to emit predetermined light and with a reflective optical modulator configured to convert the light emitted from the light source into a predetermined striped pattern, the projection unit being configured to project the striped pattern onto a measurement object at a predetermined number of frames per unit time; an imaging unit configured to take an image of at least the measurement object which the striped pattern is projected onto; an image obtaining unit configured to control the projection unit and the imaging unit and sequentially project a plurality of different striped patterns and take images of the plurality of different striped patterns, so as to obtain a plurality of different image data having different light intensity distributions; and an image processing unit configured to perform three-dimensional measurement of the measurement object, based on the plurality of different image data obtained by the image obtaining unit.

The reflective optical modulator is configured to have a two-dimensional arrangement of a plurality of pixels, which are alternatively changeable between a first state in which light entering from the light source is reflected to be projectable onto the measurement object and a second state that is different from the first state. The reflective optical modulator is configured to change a ratio of the first state of each of the pixels in one frame period and thereby generate the striped pattern.

When obtaining one image data out of the plurality of different image data, the image obtaining unit is configured to perform an imaging process that sequentially takes images during a predetermined period that includes at least a striped pattern projection period for a predetermined number of frames with regard to one striped pattern among the plurality of different striped patterns. The image obtaining unit is configured: to start a lighting process of the light source synchronously with a start timing of a first frame during the striped pattern projection period for the predetermined number of frames; and to terminate the lighting process of the light source synchronously with an end timing of a last frame during the striped pattern projection period for the predetermined number of frames.

According to one or more embodiments, the configuration of the aspect 4 described above starts and terminates the lighting process of the light source synchronously with the changeover timing of the frames of the reflective optical modulator. This causes light to be projected onto the measurement object only during the striped pattern projection period for the predetermined number of frames. This configuration accordingly allows for imaging (exposure) of only the light projected during the striped pattern projection period for the predetermined number of frames, irrespective of the start timing and the termination timing of the imaging process. Accordingly, this configuration provides similar functions and advantageous effects to those of the configuration of the aspect 1 described above.

Aspect 5. According to one or more embodiments, in the three-dimensional measurement device described in any of the above aspects 1 to 4, the reflective optical modulator may be a digital micromirror device (DMD) provided with a movable mirror, as the pixel, that is swingable and displaceable about a predetermined axis to be alternatively changeable between a first inclination state in which the light entering from the light source is reflected to be projectable onto the measurement object and a second inclination state that is different from the first inclination state.

Compared with liquid crystal devices and the like, the DMD has the higher-speed operations of the respective pixels and the less loss by a polarizer or the like. The configuration of the aspect 5 described above accordingly enables image data of high picture quality and high resolution to be obtained readily.

Aspect 6. In the three-dimensional measurement device described in any of the above aspects 1 to 5, the reflective optical modulator may be configured to generate a light pattern having a light intensity distribution of a sinusoidal waveform, as the striped pattern. The image obtaining unit may be configured to sequentially project a plurality of different striped patterns having different phases and take images of the plurality of different striped patterns, so as to obtain the plurality of different image data having different light intensity distributions. The image processing unit may be configured to perform three-dimensional measurement of the measurement object by a phase shift method, based on the plurality of image data obtained by the image obtaining unit.

The configuration of the aspect 6 described above uses the reflective optical modulator, such as a DMD, to project a striped pattern onto the measurement object. This configuration provides image data having a light intensity distribution closer to an ideal sinusoidal waveform, compared with a prior art configuration that uses a grating or the like to project a striped pattern and take an image of the projected striped pattern.

In a configuration that performs three-dimensional measurement based on a difference between luminance values of a plurality of image data taken under different striped patterns having different phases, like the phase shift method, even a small error of the luminance value is likely to have a significant effect on the measurement accuracy. Accordingly, the configuration of this aspect enhances the functions and the advantageous effects of the above aspect 1 and the like.

Aspect 7. In the three-dimensional measurement device described in any of the above aspects 1 to 6, the measurement object may be a printed circuit board with solder paste printed thereon or a printed circuit board with an adhesive applied thereon.

The configuration of the aspect 7 described above allows for height measurement and the like of the solder paste printed on the printed circuit board or the adhesive applied on the printed circuit board. This configuration accordingly allows for the quality judgment of the solder paste or the adhesive based on the measurement values in inspection of the solder paste or the adhesive. This configuration accordingly provides the functions and the advantageous effects of each of the aspects described above in such inspections and ensures the quality judgment with the high accuracy. As a result, this configuration improves the inspection accuracy of a substrate inspection apparatus.

DETAILED DESCRIPTION

Figure 1:
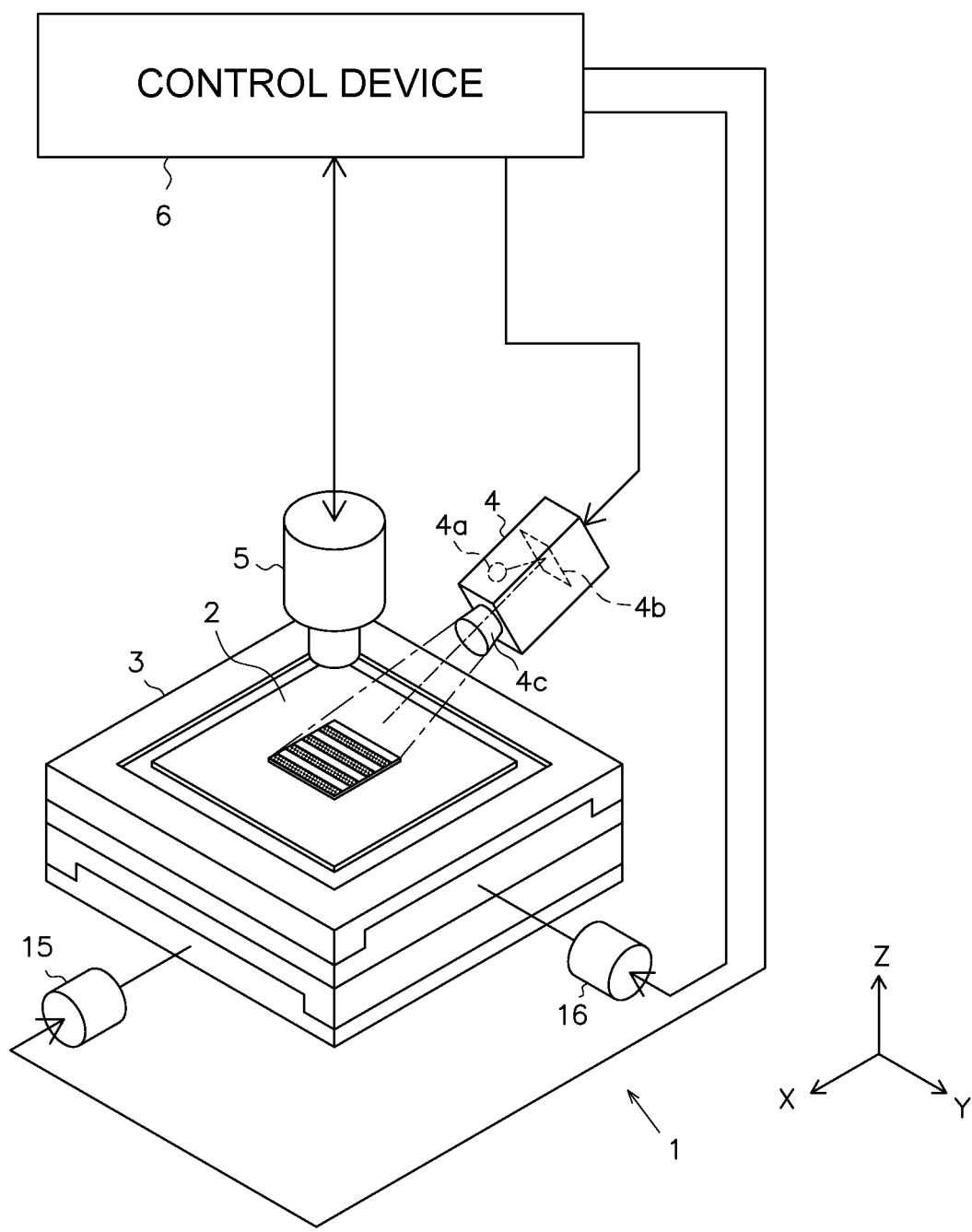
FIG. 1 is a schematic configuration diagram schematically illustrating a substrate inspection apparatus according to one or more embodiments.

The following describes embodiments of the present invention with reference to drawings. FIG. 1 is a schematic configuration diagram schematically illustrating a substrate inspection apparatus 1 equipped with a three-dimensional measurement device according to one or more embodiments. As shown in FIG. 1, the substrate inspection apparatus 1 includes a mounting table 3 configured such that a printed circuit board 2 specified as a measurement object and provided with solder paste as a measurement target printed thereon is placed on the mounting table 3, a projection device 4 serving as the projection unit (projector) configured to project a predetermined striped pattern (light pattern having a light intensity distribution of a sinusoidal waveform) obliquely downward on a surface of the printed circuit board 2, a camera 5 serving as the imaging unit configured to take an image of a projected part in which the striped pattern is projected on the printed circuit board 2, and a control device (processor) 6 configured to perform various controls, image processing and arithmetic processing in the substrate inspection apparatus 1, for example, drive controls of the projection device 4 and the camera 5. The control device 6 is configured as the image obtaining unit and as the image processing unit according to one or more embodiments.

The mounting table 3 is equipped with motors 15 and 16. The motors 15 and 16 are driven and controlled by the control device 6 to slide the printed circuit board 2 placed on the mounting table 3 in an arbitrary direction (an X-axis direction and a Y-axis direction).

The projection device 4 includes a light source 4a configured to emit predetermined light and a digital micromirror device (hereinafter abbreviated as "DMD") 4b serving as a reflective optical modulator configured to convert the light emitted from the light source 4a into a striped pattern. The projection device 4 is configured to project an optical image such as a striped pattern onto the printed circuit board 2 at a predetermined number of frames per unit time (for example, 60 frames per second: 60 FPS).

In the projection device 4, the light emitted from the light source 4a is led through a condenser lens (not shown) or the like to the DMD 4b. Light that is selectively reflected and modulated by a reflective surface of the DMD 4b is led to a projection lens 4c and is then projected onto the printed circuit board 2 via the projection lens 4c.

According to one or more embodiments, a lamp light source emitting white light is employed as the light source 4a. The light source 4a is, however, not limited to the lamp light source. For example, an LED light source or a laser light source may be employed as the light source 4a. The light source 4a employed is not limited to the light source emitting white light but may be a light source emitting another light, for example, near-infrared light.

Figure 3:
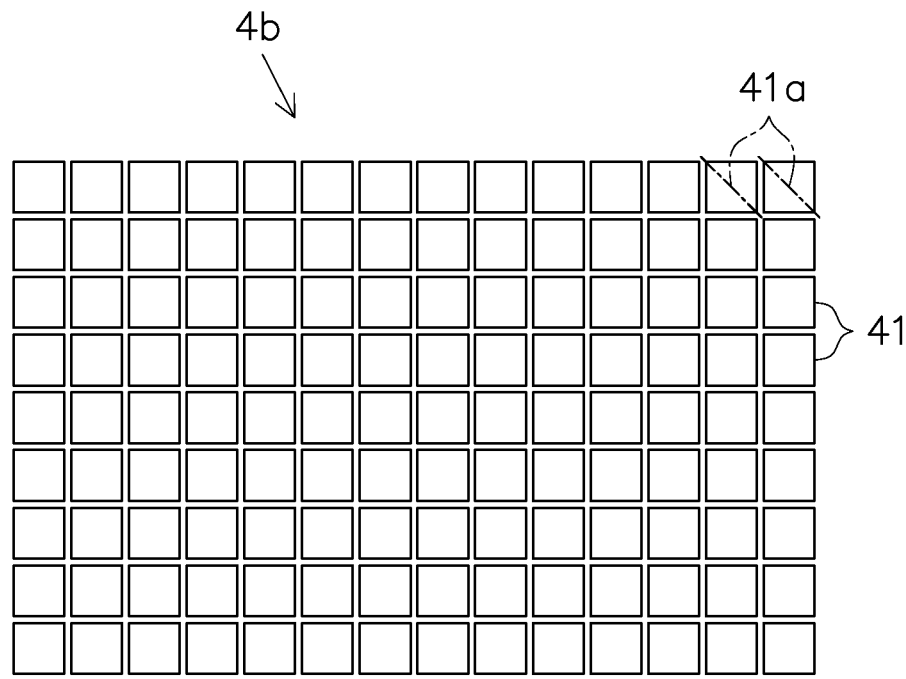
FIG. 3 is a partly enlarged plan view schematically illustrating a reflective surface of a DMD according to one or more embodiments.

The DMD 4b used according to one or more embodiments is known. The following describes the basic configuration of the DMD 4b with reference to FIG. 3. FIG. 3 is a partly enlarged plan view schematically illustrating a reflective surface of the DMD 4b.

The DMD 4b is configured such that a large number of micromirrors (movable mirrors) 41, which are drivable and controllable independently of one another and have a rectangular shape in planar view, are arranged in a two-dimensional array on a silicon substrate. Each of the micromirrors 41 forms one pixel of the DMD 4b.

Each of the micromirrors 41 is supported to be swingable about one diagonal line thereof as a swing axis 41a and is inclined by electrostatic attraction, which is generated by application of a drive voltage to a non-illustrated electrode provided on a rear face of the micromirror 41.

By taking into account this configuration, controlling a drive voltage that is to be applied to each pixel enables each micromirror 41 to be changed over between a first inclination state (hereinafter referred to as "ON state") in which each micromirror 41 is inclined at, for example, +10 degrees relative to a reference surface of the DMD 4b and a second inclination state (hereinafter referred to as "OFF state") in which each micromirror 41 is inclined at, for example, −10 degrees relative to the reference surface of the DMD 4b.

When the light emitted from the light source 4a enters a micromirror 41 in the ON state, reflected light that is reflected by the micromirror 41 enters the projection lens 4c and is projected onto the printed circuit board 2 via the projection lens 4c.

When the light emitted from the light source 4a enters a micromirror 41 in the OFF state, on the other hand, reflected light that is reflected by the micromirror 41 does not enter the projection lens 4c but is projected toward a predetermined light absorber (not shown). More specifically, the reflected light is not projected toward the printed circuit board 2, so that a black point is projected on the printed circuit board 2.

Figure 4:
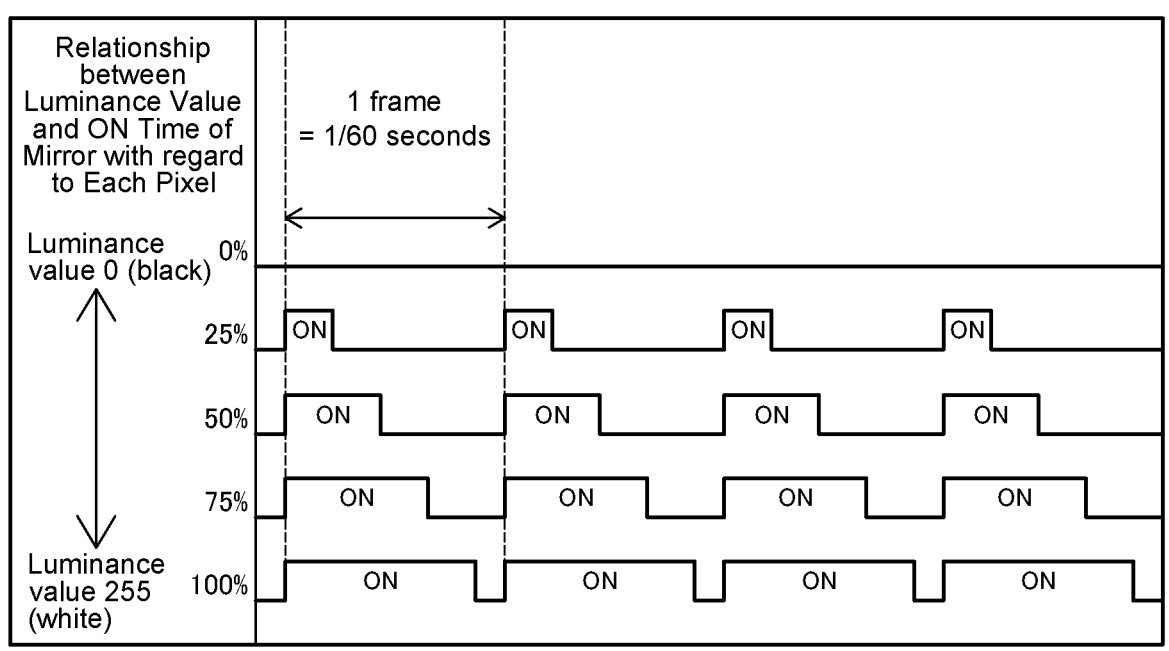
FIG. 4 is a diagram illustrating a relationship between a luminance value and an ON-time of a micromirror in respective pixels according to one or more embodiments.

As shown in FIG. 4, the DMD 4b is configured to perform on-off control at a high speed and change a time ratio (duty ratio) of the ON state of each micromirror 41 in one frame period by, for example, pulse width modulation (PWM), so as to provide, for example, tone expression of 256 tones with regard to each pixel.

Each of the micromirrors 41 arranged in the two-dimensional array on the DMD 4b is individually driven and controlled by a control signal that is generated on the basis of projection pattern information specified in advance. This causes an optical image such as a striped pattern (light pattern having a light intensity distribution of a sinusoidal waveform) modulated according to the projection pattern information to be projected on the printed circuit board 2.

The camera 5 is comprised of, for example, lenses and imaging elements. According to one or more embodiments, CMOS sensors are employed as the imaging elements. The imaging elements are, however, not limited to the CMOS sensors, but CCD sensors or the like may be employed as the imaging elements.

Image data taken and obtained by the camera 5 is converted into a digital signal in the camera 5, is input in the form of the digital signal to the control device 6, and is stored in an image data storage device 24 described later. The control device 6 performs, for example, image processing and arithmetic processing described later, based on the image data.

Figure 2:
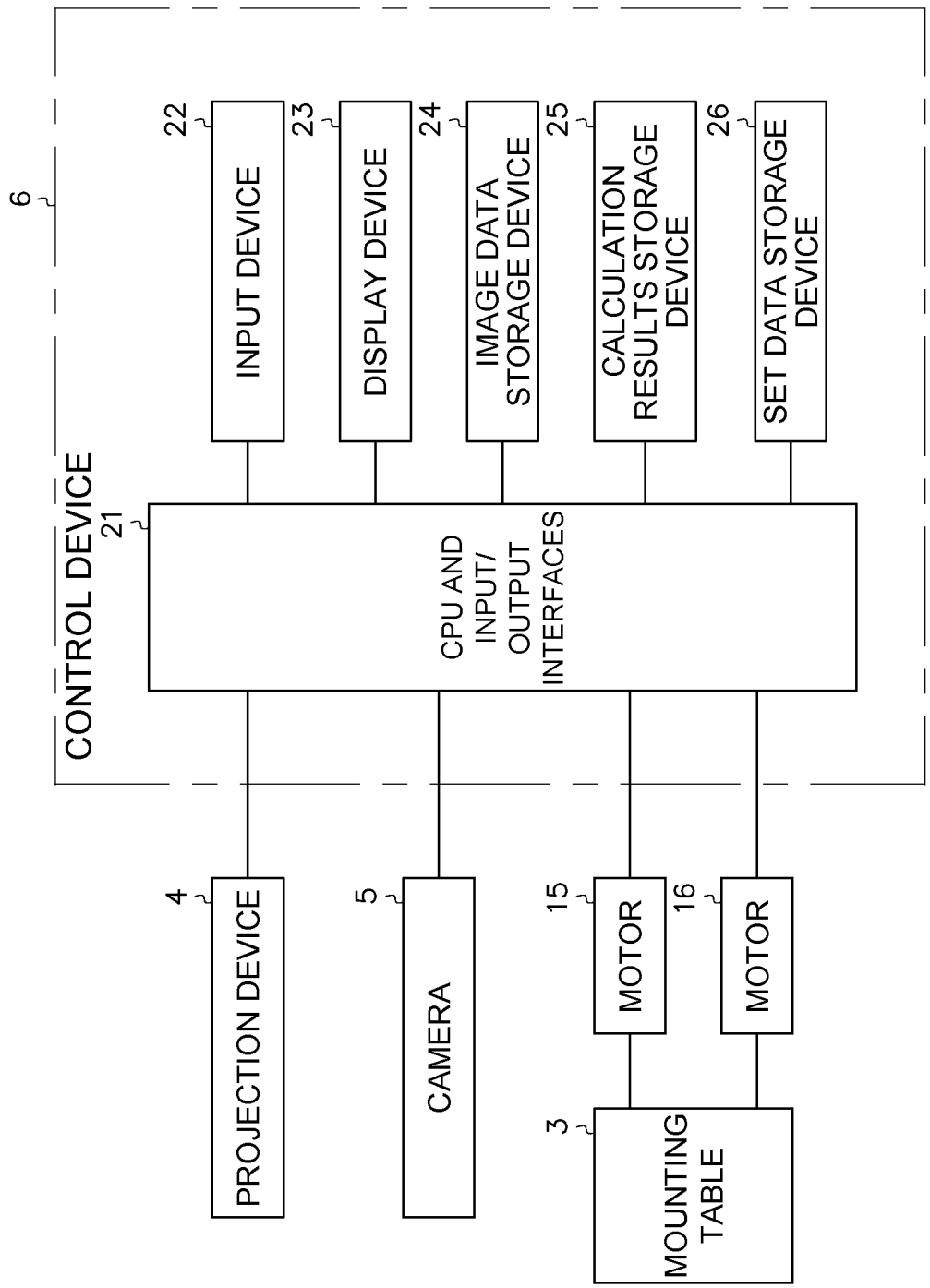
FIG. 2 is a block diagram illustrating the electrical configuration of the substrate inspection apparatus according to one or more embodiments.

The following describes the electrical configuration of the control device 6. As shown in FIG. 2, the control device 6 includes a CPU and input/output interfaces 21 (hereinafter referred to as "CPU and the like 21") configured to control the entire substrate inspection apparatus 1, an input device 22 serving as the "input unit" comprised of a keyboard, a mouse, a touch panel and the like, a display device 23 serving as the "display unit" having a display screen, such as a CRT or a liquid crystal screen, an image data storage device 24 configured to store image data and the like taken and obtained by the camera 5, a calculation results storage device 25 configured to store results of various calculations, and a set data storage device 26 configured to store design information with regard to the printed circuit board 2 and various information including projection pattern information with regard to a striped pattern and the like generated by the projection device 4. These devices 22 to 26 are electrically connected with the CPU and the like 21.

Figure 5:
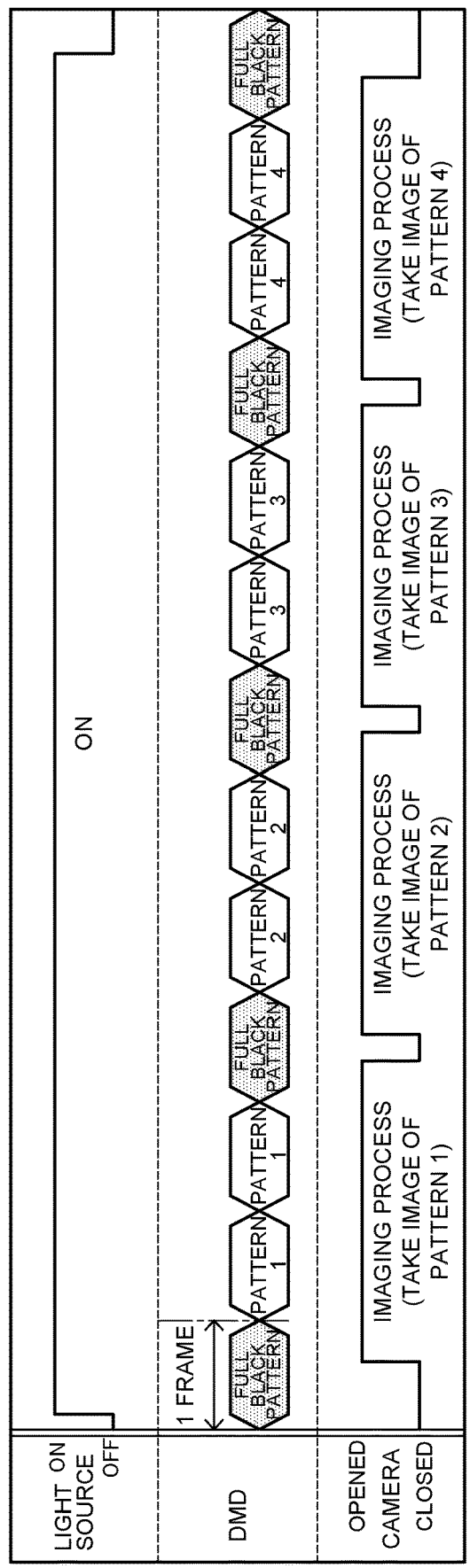
FIG. 5 is a timing chart illustrating processing operations of a projection device and a camera according to one or more embodiments.

The following describes in detail an inspection routine performed with regard to each inspection area of the printed circuit board 2 by the substrate inspection apparatus 1 with reference to FIG. 5. FIG. 5 is a timing chart illustrating processing operations of the projection device 4 and the camera 5.

This inspection routine is performed by the control device 6 (the CPU and the like 21). According to one or more embodiments, the control device 6 performs an image obtaining process four times with regard to each inspection area, so as to obtain four different image data having different light intensity distributions.

The control device 6 first drives and controls the motors 15 and 16 to move the printed circuit board 2 and adjust the field of view of the camera 5 (imaging range) to a predetermined inspection area on the printed circuit board 2. The inspection area denotes one of divisional areas provided by dividing the surface of the printed circuit board 2 in advance with setting the size of the field of view of the camera 5 as one unit.

The control device 6 subsequently starts a full black pattern generation process for one frame at a predetermined timing in response to a clock signal or the like.

More specifically, the control device 6 drives and controls the projection device 4 to perform a process of keeping all the pixels (all the micromirrors 41) of the DMD 4b off over an entire one-frame period. This prevents light from being continuously projected from the projection device 4 onto the printed circuit board 2 over the entire one-frame period irrespective of turning on or off the light source 4a, but projects a full black pattern.

The control device 6 starts a lighting process of the light source 4a at a predetermined timing in this full black pattern projection period. According to one or more embodiments, a lighting period of the light source 4a continues until completion of four imaging processes with regard to one inspection area.

The control device 6 also drives and controls the camera 5 to start a first imaging process (exposure process) at a predetermined timing in this full black pattern projection period (after lighting of the light source 4 in the illustrated example of FIG. 5). Light does not enter the camera 5 during the full black pattern projection period, so that no electric charges are accumulated in imaging elements.

After termination of the full black pattern projection period (full black pattern generation process) described above, the control device 6 performs a first striped pattern generation process. More specifically, the control device 6 drives and controls the DMD 4b to perform a generation process of a first striped pattern (pattern 1 having a phase of "0 degree") among four different striped patterns having different phases, with regard to a predetermined number of frames (with regard to two frames in the illustrated example of FIG. 5). This causes the first striped pattern to be projected onto the printed circuit board 2 for a period of the predetermined number of frames. In the meanwhile, the first imaging process by the camera 5 is continuously performed.

After termination of the first striped pattern projection period (striped pattern generation process), the control device 6 performs the full black pattern generation process for another one frame in the same manner as described above to project a full black pattern onto the printed circuit board 2.

The control device 6 terminates the first imaging process and starts a second imaging process at predetermined timings in this full black pattern projection period. After termination of each imaging process, image data taken and obtained by the camera 5 are transferred to and stored in the image data storage device 24.

After termination of the full black pattern projection period (full black pattern generation process) described above, the control device 6 performs a second striped pattern generation process. More specifically, the control device 6 drives and controls the DMD 4b to perform a generation process of a second striped pattern (pattern 2 having a phase of "90 degree") with regard to a predetermined number of frames (with regard to two frames in the illustrated example of FIG. 5). This causes the second striped pattern to be projected onto the printed circuit board 2 for a period of the predetermined number of frames. In the meanwhile, the second imaging process by the camera 5 is continuously performed.

After termination of the second striped pattern projection period (striped pattern generation process), the control device 6 performs the full black pattern generation process for another one frame in the same manner as described above to project a full black pattern onto the printed circuit board 2. The control device 6 terminates the second imaging process and starts a third imaging process at predetermined timings in this full black pattern projection period.

After termination of the full black pattern projection period (full black pattern generation process) described above, the control device 6 performs a third striped pattern generation process. More specifically, the control device 6 drives and controls the DMD 4b to perform a generation process of a third striped pattern (pattern 3 having a phase of "180 degree") with regard to a predetermined number of frames (with regard to two frames in the illustrated example of FIG. 5). This causes the third striped pattern to be projected onto the printed circuit board 2 for a period of the predetermined number of frames. In the meanwhile, the third imaging process by the camera 5 is continuously performed.

After termination of the third striped pattern projection period (striped pattern generation process), the control device 6 performs the full black pattern generation process for another one frame in the same manner as described above to project a full black pattern onto the printed circuit board 2. The control device 6 terminates the third imaging process and starts a fourth imaging process at predetermined timings in this full black pattern projection period.

After termination of the full black pattern projection period (full black pattern generation process) described above, the control device 6 performs a fourth striped pattern generation process. More specifically, the control device 6 drives and controls the DMD 4b to perform a generation process of a fourth striped pattern (pattern 4 having a phase of "270 degree") with regard to a predetermined number of frames (with regard to two frames in the illustrated example of FIG. 5). This causes the fourth striped pattern to be projected onto the printed circuit board 2 for a period of the predetermined number of frames. In the meanwhile, the fourth imaging process by the camera 5 is continuously performed.

After termination of the fourth striped pattern projection period (striped pattern generation process), the control device 6 performs the full black pattern generation process for another one frame in the same manner as described above to project a full black pattern onto the printed circuit board 2. At a predetermined timing in this full black pattern projection period, the control device 6 terminates the fourth imaging process. The control device 6 also terminates the lighting process of the light source 4a at a predetermined timing in this full black pattern projection period (after completion of the four imaging processes in the illustrated example of FIG. 5).

Performing the image obtaining process four times as described above provides four different image data having different light intensity distributions, which are required for three-dimensional measurement, with regard to a predetermined inspection area.

The control device 6 subsequently performs three-dimensional measurement (height measurement) by the known phase shift method described in Background by using the four different image data (luminance values of respective pixels) obtained as described above and stores the measurement results into the calculation results storage device 25.

The control device 6 subsequently performs a good/poor quality determination process of solder paste, based on the results of the three-dimensional measurement (height data at respective coordinates). More specifically, the control device 6 detects a printing range of solder paste that is higher than a reference plane, based on the measurement results of the inspection area obtained as described above, and integrates the heights at respective locations in this printing range to calculate the printed amount of solder paste.

The control device 6 then compares the data of solder paste determined as described above, for example, the position, the area, and the height or the amount of solder paste, with reference data (for example, Gerber data) stored in advance in the set data storage device 26, and determines the good/poor quality of the printing state of solder paste in the inspection area by determining whether the result of comparison is within an allowable range.

During such processing, the control device 6 drives and controls the motors 15 and 16 to move the printed circuit board 2 to a next inspection area. The control device 6 subsequently performs the series of processing described above repeatedly with regard to all the inspection areas to complete inspection of the entire printed circuit board 2.

As described above in detail, the configuration of one or more embodiments causes the striped pattern to be projected onto the printed circuit board 2 by using the DMD 4b and thereby enables the intermediate tones of the striped pattern to be expressed more precisely. This causes the projected striped pattern to have a light intensity distribution close to an ideal sinusoidal waveform. As a result, this provides image data of the higher accuracy for three-dimensional measurement by using the phase shift method.

Furthermore, the configuration of one or more embodiments sets the full black pattern projection period for one frame before and after the striped pattern projection period for the predetermined number of frames and starts and terminates the imaging process by the camera 5 during the full black pattern projection period. No light enters the camera 5 during the full black pattern projection period, so that no electric charges are accumulated in the imaging elements. This configuration enables only the light projected in the striped pattern projection period for the predetermined number of frames to be imaged.

This causes the luminance of light (tone corresponding to the duty ratio) expressed by the respective pixels of the DMD 4b in the unit of a frame to be reflected appropriately on the image data obtained by the camera 5. As a result, this configuration suppresses reduction of the measurement accuracy in three-dimensional measurement by using the phase shift method.

Figure 6:
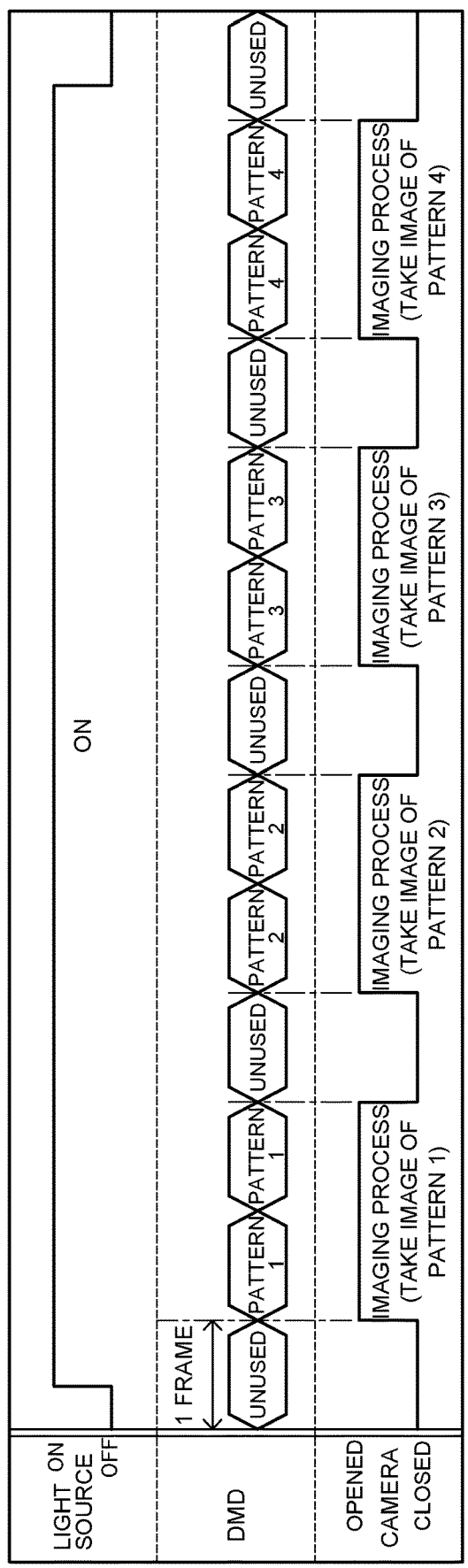
FIG. 6 is a timing chart illustrating processing operations of a projection device and a camera according to one or more embodiments.

The following describes one or more embodiments in detail with reference to FIG. 6. FIG. 6 is a timing chart illustrating processing operations of the projection device 4 and the camera 5 according to one or more embodiments. Identical portions with those of the embodiments described above are expressed by identical component names, identical reference signs or the like with omission of their detailed description. The following mainly describes portions different from those of one or more embodiments described above.

In an inspection routine of each inspection area according to one or more embodiments, the control device 6 first drives and controls the motors 15 and 16 to move the printed circuit board 2 and adjust the field of view of the camera 5 (imaging range) to a predetermined inspection area on the printed circuit board 2.

The control device 6 subsequently performs a process of setting an unused interval period for one frame at a predetermined timing in response to a clock signal or the like. The term "unused" herein means "not used to obtain image data, irrespective of whether or not any optical image is projected onto the printed circuit board 2".

The control device 6 starts a lighting process of the light source 4a at a predetermined timing in interval period. According to one or more embodiments, a lighting period of the light source 4a continues until completion of four imaging processes with regard to one inspection area.

After termination of the interval period described above, the control device 6 performs a first striped pattern generation process. More specifically, the control device 6 drives and controls the DMD 4b to perform a generation process of a first striped pattern (pattern 1 having a phase of "0 degree") among four different striped patterns having different phases, with regard to a predetermined number of frames (with regard to two frames in the illustrated example of FIG. 6). This causes the first striped pattern to be projected onto the printed circuit board 2 for a period of the predetermined number of frames.

The control device 6 starts a first imaging process by the camera 5, synchronously with a first frame start timing of this striped pattern projection period. The control device 6 then terminates the first imaging process, synchronously with a last frame end timing of this striped pattern projection period. In the meantime, the first imaging process is performed continuously.

Simultaneously with termination of the first striped pattern generation process and the first imaging process, the control device 6 performs a process of setting an interval period for another one frame in the same manner as described above.

After termination of the interval period described above, the control device 6 performs a second striped pattern generation process. More specifically, the control device 6 drives and controls the DMD 4b to perform a generation process of a second striped pattern (pattern 2 having a phase of "90 degree") with regard to a predetermined number of frames (with regard to two frames in the illustrated example of FIG. 6). This causes the second striped pattern to be projected onto the printed circuit board 2 for a period of the predetermined number of frames.

The control device 6 starts a second imaging process by the camera 5, synchronously with a first frame start timing of this striped pattern projection period. The control device 6 then terminates the second imaging process, synchronously with a last frame end timing of this striped pattern projection period. In the meantime, the second imaging process is performed continuously.

Simultaneously with termination of the second striped pattern generation process and the second imaging process, the control device 6 performs a process of setting an interval period for another one frame in the same manner as described above.

After termination of the interval period described above, the control device 6 performs a third striped pattern generation process. More specifically, the control device 6 drives and controls the DMD 4b to perform a generation process of a third striped pattern (pattern 3 having a phase of "180 degree") with regard to a predetermined number of frames (with regard to two frames in the illustrated example of FIG. 6). This causes the third striped pattern to be projected onto the printed circuit board 2 for a period of the predetermined number of frames.

The control device 6 starts a third imaging process by the camera 5, synchronously with a first frame start timing of this striped pattern projection period. The control device 6 then terminates the third imaging process, synchronously with a last frame end timing of this striped pattern projection period. In the meantime, the third imaging process is performed continuously.

Simultaneously with termination of the third striped pattern generation process and the third imaging process, the control device 6 performs a process of setting an interval period for another one frame in the same manner as described above.

After termination of the interval period described above, the control device 6 performs a fourth striped pattern generation process. More specifically, the control device 6 drives and controls the DMD 4b to perform a generation process of a fourth striped pattern (pattern 4 having a phase of "270 degree") with regard to a predetermined number of frames (with regard to two frames in the illustrated example of FIG. 6). This causes the fourth striped pattern to be projected onto the printed circuit board 2 for a period of the predetermined number of frames.

The control device 6 starts a fourth imaging process by the camera 5, synchronously with a first frame start timing of this striped pattern projection period. The control device 6 then terminates the fourth imaging process, synchronously with a last frame end timing of this striped pattern projection period. In the meantime, the fourth imaging process is performed continuously.

Simultaneously with termination of the fourth striped pattern generation process and the fourth imaging process, the control device 6 performs a process of setting an interval period for another one frame in the same manner as described above. The control device 6 then terminates the lighting process of the light source 4a at a predetermined timing in this interval period.

As described above in detail, the configuration of one or more embodiments starts and terminates the imaging process synchronously with the changeover timing of the frames of the DMD 4b. As a result, this configuration provides similar functions and advantageous effects to those of the embodiments described above.

Figure 7:
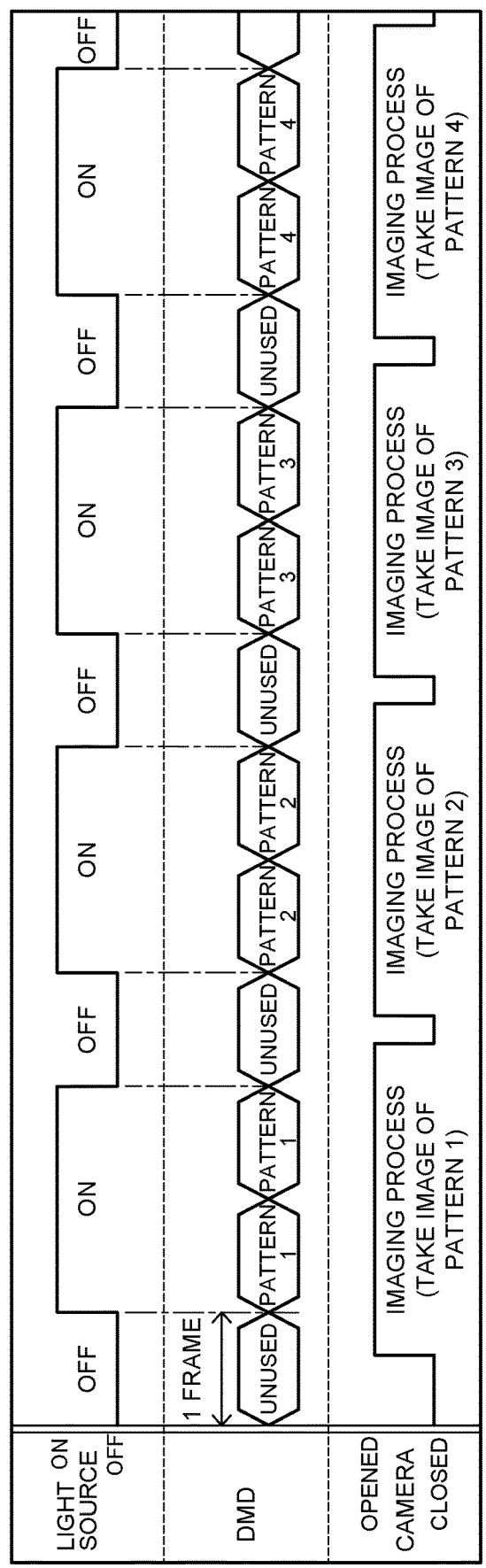
FIG. 7 is a timing chart illustrating processing operations of a projection device and a camera according to one or more embodiments.
Figure 8:
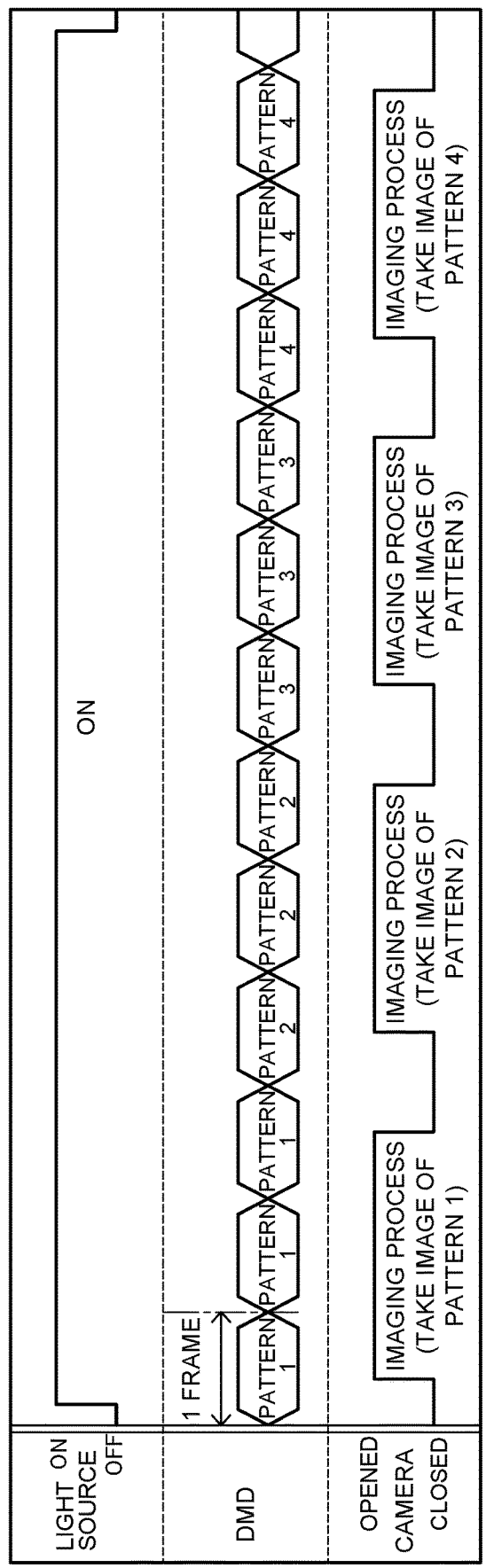
FIG. 8 is a timing chart illustrating processing operations of a prior art projection device and a prior art camera.

The following describes one or more embodiments in detail with reference to FIG. 7. FIG. 7 is a timing chart illustrating processing operations of the projection device 4 and the camera 5 according to one or more embodiments. Identical portions with those of the embodiments described above are expressed by identical component names, identical reference signs or the like with omission of their detailed description. The following mainly describes portions different from those of the embodiments described above.

In an inspection routine of each inspection area according to one or more embodiments, the control device 6 first drives and controls the motors 15 and 16 to move the printed circuit board 2 and adjust the field of view of the camera 5 (imaging range) to a predetermined inspection area on the printed circuit board 2.

The control device 6 subsequently performs a process of setting an unused interval period for one frame at a predetermined timing in response to a clock signal or the like. The term "unused" herein means "not used for projection of a striped pattern".

At a predetermined timing in this interval period, the control device 6 drives and controls the camera 5 to start a first imaging process (exposure process). Light does not enter the camera 5 during the interval period, so that no electric charges are accumulated in imaging elements.

After termination of the interval period described above, the control device 6 performs a first striped pattern generation process. More specifically, the control device 6 drives and controls the DMD 4b to perform a generation process of a first striped pattern (pattern 1 having a phase of "0 degree") among four different striped patterns having different phases, with regard to a predetermined number of frames (with regard to two frames in the illustrated example of FIG. 7).

The control device 6 starts a first lighting process of the light source 4a, synchronously with a first frame start timing of this striped pattern generation process. The control device 6 then terminates the first lighting process of the light source 4a, synchronously with a last frame end timing of this striped pattern generation process. This causes the first striped pattern to be projected onto the printed circuit board 2 for a period of the predetermined number of frames.

Simultaneously with termination of the first striped pattern projection period (striped pattern projection process and lighting process), the control device 6 performs a process of setting an interval period for another one frame in the same manner as described above. The control device 6 terminates the first imaging process and starts a second imaging process at predetermined timings in this interval period.

After termination of the interval period described above, the control device 6 performs a second striped pattern generation process. More specifically, the control device 6 drives and controls the DMD 4b to perform a generation process of a second striped pattern (pattern 2 having a phase of "90 degree") with regard to a predetermined number of frames (with regard to two frames in the illustrated example of FIG. 7).

The control device 6 starts a second lighting process of the light source 4a, synchronously with a first frame start timing of this striped pattern generation process. The control device 6 then terminates the second lighting process of the light source 4a, synchronously with a last frame end timing of this striped pattern generation process. This causes the second striped pattern to be projected onto the printed circuit board 2 for a period of the predetermined number of frames.

Simultaneously with termination of the second striped pattern projection period (striped pattern projection process and lighting process), the control device 6 performs a process of setting an interval period for another one frame in the same manner as described above. The control device 6 terminates the second imaging process and starts a third imaging process at predetermined timings in this interval period.

After termination of the interval period described above, the control device 6 performs a third striped pattern generation process. More specifically, the control device 6 drives and controls the DMD 4b to perform a generation process of a third striped pattern (pattern 3 having a phase of "180 degree") with regard to a predetermined number of frames (with regard to two frames in the illustrated example of FIG. 7).

The control device 6 starts a third lighting process of the light source 4a, synchronously with a first frame start timing of this striped pattern generation process. The control device 6 then terminates the third lighting process of the light source 4a, synchronously with a last frame end timing of this striped pattern generation process. This causes the third striped pattern to be projected onto the printed circuit board 2 for a period of the predetermined number of frames.

Simultaneously with termination of the third striped pattern projection period (striped pattern projection process and lighting process), the control device 6 performs a process of setting an interval period for another one frame in the same manner as described above. The control device 6 terminates the third imaging process and starts a fourth imaging process at predetermined timings in this interval period.

After termination of the interval period described above, the control device 6 performs a fourth striped pattern generation process. More specifically, the control device 6 drives and controls the DMD 4b to perform a generation process of a fourth striped pattern (pattern 4 having a phase of "270 degree") with regard to a predetermined number of frames (with regard to two frames in the illustrated example of FIG. 7).

The control device 6 starts a fourth lighting process of the light source 4a, synchronously with a first frame start timing of this striped pattern generation process. The control device 6 then terminates the fourth lighting process of the light source 4a, synchronously with a last frame end timing of this striped pattern generation process. This causes the fourth striped pattern to be projected onto the printed circuit board 2 for a period of the predetermined number of frames.

Simultaneously with termination of the fourth striped pattern projection period (striped pattern projection process and lighting process), the control device 6 performs a process of setting an interval period for another one frame in the same manner as described above. The control device 6 terminates the fourth imaging process at a predetermined timing in this interval period.

As described above in detail, the configuration of one or more embodiments starts and terminates the lighting process of the light source 4a synchronously with the changeover timing of the frames of the DMD 4b. This causes light to be projected onto the printed circuit board 2 only during the striped pattern projection period for the predetermined number of frames. This configuration thus enables only the light projected during the striped pattern projection period for the predetermined number of frames to be imaged, irrespective of the timings of starting and terminating the imaging process. As a result, this configuration provides similar functions and advantageous effects to those of the embodiments described above.

The present invention is not limited to the description of the above embodiments but may be implemented, for example, by configurations described below. The present invention may also be naturally implemented by applications and modifications other than those illustrated below.

(a) According to the above embodiments, the three-dimensional measurement device is embodied in the substrate inspection apparatus 1 (solder printing inspection apparatus) configured to inspect the printing state of solder paste printed on the printed circuit board 2. This is, however, not restrictive. For example, the three-dimensional measurement device may be embodied in a configuration of measuring another object, for example, an adhesive applied on a printed circuit board, an electronic component mounted on a printed circuit board, or a solder bump formed on a wafer substrate.

(b) The above embodiments are configured to obtain four different image data having different phases of the striped pattern by 90 degrees each, such as to be used for three-dimensional measurement by the phase shift method. The frequency of phase shift and the amount of phase shift are, however, not limited to this configuration. Another frequency of phase shift and another amount of phase shift may be employed as long as these allow for three-dimensional measurement by the phase shift method.

For example, three different image data having different phases by 120 degrees each (or by 90 degrees each) may be obtained and used for three-dimensional measurement. In another example, two different image data having different phases by 180 degrees (or by 90 degrees) may be obtained and used for three-dimensional measurement.

(c) The above embodiments are configured to perform three-dimensional measurement by the phase shift method. This configuration is, however, not restrictive. The above embodiments may employ another pattern projection method (three-dimensional measurement method), for example, a space coding method. In the case of measurement of a small measurement object, such as solder paste, however, a measurement method of the high measurement accuracy, for example, the phase shift method may be employed.

(d) The configuration of the substrate inspection apparatus 1 is not limited to the configurations of the embodiments described above. For example, the above embodiments are configured to drive and control the motors 15 and 16 such as to move the printed circuit board 2 and adjust the field of view of the camera 5 (imaging range) to a predetermined inspection area on the printed circuit board 2. This configuration is, however, not restrictive. For example, the above embodiments may be configured to move an inspection head comprised of the projection device 4 and the camera 5 and adjust the inspection head to a predetermined inspection area on the printed circuit board 2, while fixing the printed circuit board 2.

(e) The configuration involved in the projection device 4 is not limited to the configurations of the embodiments described above. For example, according to the above embodiments, the DMD 4b is employed as the reflective optical modulator. Another element, for example, a reflective liquid crystal on silicon (LCOS) may be employed as the reflective optical modulator.

The number of pixels, the number of tones and the frame rate involved in the DMD 4b, the two-dimensional arrangement of the micromirrors 41, the direction of the swing axis 41a of the micromirror 41, the inclination angle of the micromirror 41, and the like are not limited to those of the above embodiments, but another configuration may be employed.

According to the above embodiments, pulse width modulation (PWM) is illustrated as the method of changing the time ratio (duty ratio) of the ON state of each micromirror 41 of the DMD 4b in one frame period. This method is, however, not essential. For example, another employable method is pulse density modulation (PDM) that regulates the frequency of the ON state of each micromirror 41 in one frame period.

(f) The start timing and the termination timing of the lighting process of the light source 4a as well as the start timing and the termination timing of the imaging process of the camera 5 are not limited to those of the above embodiments.

For example, the embodiments described above are configured to continue the lighting period of the light source 4a until completion of the four imaging processes with regard to one inspection area. This configuration is, however, not essential. A modification may be configured to once turn off the light source 4a before or after the striped pattern projection period (during the full black pattern projection period or during the interval period).

Furthermore, under this modified configuration, a modification of one or more embodiments may be configured to synchronize the start timing of the lighting process of the light source 4a with the start timing of the imaging process of the camera 5 during the full black pattern projection period before the striped pattern projection period, and/or, to synchronize the termination timing of the lighting process of the light source 4a with the termination timing of the imaging process of the camera 5 during the full black pattern projection period after the striped pattern projection period.

Additionally, the configuration of the embodiments described above may be combined with each other. More specifically, one of the start and the termination of the imaging process by the camera 5 may be performed before the striped pattern projection period or during the full black pattern projection period, whereas the other may be performed synchronously with the changeover timing of the frames of the DMD 4b before or after the striped pattern projection period.

A modification of the embodiments described above may be configured to start the imaging process of the camera 5 synchronously with the start timing of the first frame during the striped pattern projection period (the striped pattern generation process of the DMD 4b and the lighting process of the light source 4a), and/or to terminate the imaging process of the camera 5 synchronously with the end timing of the last frame during the striped pattern projection period.

REFERENCE SIGNS LIST

1 . . . substrate inspection apparatus, 2 . . . printed circuit board, 4 . . . projection device, 4a . . . light source, 4b . . . digital micromirror device (DMD), 5 . . . camera, 6 . . . control device, 4c . . . projection lens, 41 . . . micromirror, 41a . . . swing axis Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A three-dimensional measurement device, comprising:
 a projector that comprises:
  a light source that emits predetermined light; and
  a reflective optical modulator that converts the predetermined light into a predetermined striped pattern, wherein the projector projects the predetermined striped pattern onto a measurement object at a predetermined number of frames per unit time;
 an imaging device that takes an image of the measurement object projected with the predetermined striped pattern;
 a processor that:
  controls the projector and the imaging device to sequentially project a plurality of different ones of the predetermined striped pattern and take images of the plurality of different ones of the predetermined striped pattern to obtain a plurality of image data having different light intensity distributions; and executes three-dimensional measurement of the measurement object based on the plurality of image data, wherein the reflective optical modulator comprises a plurality of two-dimensionally arranged pixels that are alternatively changeable between a first state in which light entering the reflective optical modulator from the light source is reflected onto the measurement object and a second state different from the first state, the reflective optical modulator changes a ratio of the two-dimensionally arranged pixels in the first state in one frame period to generate the predetermined striped pattern, the processor obtains one image data out of the plurality of image data by executing an imaging process that sequentially takes images during a predetermined period that includes a striped pattern projection period, wherein one of the plurality of different ones of the predetermined stripped pattern is projected for a predetermined number of frames within the striped pattern projection period, and the processor further:

sets, before and after the striped pattern projection period, a full black pattern projection period for at least one frame during which a predetermined full black pattern is projected; and starts the imaging process during the full black pattern projection period before the striped pattern projection period, and terminates the imaging process during the full black pattern projection period after the striped pattern projection period.

2. A three-dimensional measurement device, comprising:

a projector that comprises:

a light source that emits predetermined light; and a reflective optical modulator that converts the predetermined light into a predetermined striped pattern, wherein the projector projects the predetermined striped pattern onto a measurement object at a predetermined number of frames per unit time;

an imaging device that takes an image of the measurement object projected with the predetermined striped pattern;

a processor that:

controls the projector and the imaging device to sequentially project a plurality of different ones of the predetermined striped pattern and take images of the plurality of different ones of the predetermined striped pattern to obtain a plurality of image data having different light intensity distributions; and executes three-dimensional measurement of the measurement object based on the plurality of image data, wherein the reflective optical modulator comprises a plurality of two-dimensionally arranged pixels that are alternatively changeable between a first state in which light entering the reflective optical modulator from the light source is reflected onto the measurement object and a second state different from the first state, the reflective optical modulator changes a ratio of the two-dimensionally arranged pixels in the first state in one frame period to generate the predetermined striped pattern, the processor obtains one image data out of the plurality of image data by executing an imaging process that sequentially takes images during a predetermined period that includes a striped pattern projection period, wherein one of the plurality of different ones of the predetermined striped pattern is projected for two or more frames in the stripped pattern projection period, and during the stripped pattern projection period, the processor further:

starts the imaging process synchronously with a start timing of a first frame, among the two or more frames;

terminates the imaging process synchronously with an end timing of a last frame, among the two or more frames; and creates at least one unused frame between an end of projecting or imaging of one of the plurality of different ones of the predetermined striped pattern and a start of projecting or imaging of another of the plurality of different ones of the predetermined striped pattern.

3. A three-dimensional measurement device, comprising:

a projector that comprises:

a light source that emits predetermined light; and a reflective optical modulator that converts the predetermined light into a predetermined striped pattern, wherein the projector projects the predetermined striped pattern onto a measurement object at a predetermined number of frames per unit time;

an imaging device that takes an image of the measurement object projected with the predetermined striped pattern;

a processor that:

controls the projector and the imaging device to sequentially project a plurality of different ones of the predetermined striped pattern and take images of the plurality of different ones of the predetermined striped pattern to obtain a plurality of image data having different light intensity distributions; and executes three-dimensional measurement of the measurement object based on the plurality of image data, wherein the reflective optical modulator comprises a plurality of two-dimensionally arranged pixels that are alternatively changeable between a first state in which light entering the reflective optical modulator from the light source is reflected onto the measurement object and a second state different from the first state, and the reflective optical modulator changes a ratio of the two-dimensionally arranged pixels in the first state in one frame period to generate the predetermined striped pattern, and the processor obtains one image data out of the plurality of image data by executing an imaging process that sequentially takes images during a predetermined period that includes a striped pattern projection period, wherein one of the plurality of different ones of the predetermined striped pattern is projected for two or more frames in the stripped pattern projection period, the processor further:

sets, before the striped pattern projection period, a full black pattern projection period for at least one frame during which a predetermined full black pattern is projected;

starts the imaging process during the full black pattern projection period before the striped pattern projection period; and creates at least one unused frame between an end of projecting or imaging of one of the plurality of different ones of the predetermined striped pattern and a start of projecting or imaging of another of the plurality of different ones of the predetermined striped pattern.

4. A three-dimensional measurement device, comprising:
a projector that comprises:
  a light source that emits predetermined light; and
  a reflective optical modulator that converts the predetermined light into a predetermined striped pattern, wherein the projector projects the predetermined striped pattern onto a measurement object at a predetermined number of frames per unit time;
an imaging device that takes an image of the measurement object projected with the predetermined striped pattern;
a projector that:
  controls the projector and the imaging device to sequentially project a plurality of different ones of the predetermined striped patterns and take images of the plurality of different ones of the predetermined striped pattern to obtain a plurality of image data having different light intensity distributions; and
  executes three-dimensional measurement of the measurement object based on the plurality of image data, wherein
the reflective optical modulator comprises a plurality of pixels that are two-dimensionally arranged and are alternatively changeable between a first state in which light entering the reflective optical modulator from the light source is reflected onto the measurement object and a second state different from the first state,
the reflective optical modulator changes a ratio of the two-dimensionally arranged pixels in the first state in one frame period to generate the predetermined striped pattern,
the processor obtains one image data out of the plurality of image data by executing an imaging process that sequentially takes images during a predetermined period that includes a striped pattern projection period, wherein
  one of the plurality of different ones of the predetermined striped pattern is projected for two or more frames in the stripped pattern projection period, and
the processor:
  sets, after the striped pattern projection period, a full black pattern projection period for at least one frame during which a predetermined full black pattern is projected;
  terminates the imaging process during the full black pattern projection period after the striped pattern projection period; and
  creates at least one unused frame between an end of projecting or imaging of one of the plurality of different ones of the predetermined striped pattern and a start of projecting or imaging of another of the plurality of different ones of the predetermined striped pattern.

5. A three-dimensional measurement device, comprising:
a projector that comprises:
  a light source that emits predetermined light; and
  a reflective optical modulator that converts the predetermined light into a predetermined striped pattern, wherein the projector projects the predetermined striped pattern onto a measurement object at a predetermined number of frames per unit time;
an imaging device that takes an image of the measurement object projected with the striped pattern;
a processor that:
  controls the projector and the imaging device to sequentially project a plurality of different ones of the predetermined striped patterns and take images of the plurality of different ones of the predetermined striped patterns to obtain a plurality of image data having different light intensity distributions; and
  executes three-dimensional measurement of the measurement object based on the plurality of image data, wherein
the reflective optical modulator comprises a plurality of pixels that are two-dimensionally arranged and are alternatively changeable between a first state in which light entering the reflective optical modulator from the light source is reflected onto the measurement object and a second state different from the first state, and
the reflective optical modulator changes a ratio of the two-dimensionally arranged pixels in the first state in one frame period to generate the predetermined striped pattern, and
the processor obtains one image data out of the plurality of image data by executing an imaging process that sequentially takes images during a predetermined period that includes at least a striped pattern projection period, wherein
one of the plurality of different ones of the predetermined striped pattern is projected for two or more frames in the stripped pattern projection period, wherein
during the striped pattern projection period, the processor further:
  starts a lighting process of the light source synchronously with a start timing of a first frame, among the two or more frames; and
  terminates the lighting process synchronously with an end timing of a last frame, among the two or more frames.

6. The three-dimensional measurement device according to claim 1, wherein
the reflective optical modulator is a digital micromirror device that comprises a plurality of movable mirrors that each correspond to one of the plurality of pixels,
the movable mirror swings and displaces about a predetermined axis, and
the movable mirror alternatively changes between a first inclination state in which the light entering the reflective optical modulator from the light source is reflected onto the measurement object and a second inclination state different from the first inclination state.

7. The three-dimensional measurement device according to claim 1, wherein
the reflective optical modulator generates a light pattern with a light intensity distribution of a sinusoidal waveform as the predetermined striped pattern, and
the processor further:
  sequentially projects the plurality of different ones of the predetermined striped pattern with different phases and takes images of the plurality of different ones of the striped pattern to obtain the plurality of image data; and
  executes the three-dimensional measurement using a phase shift method.

8. The three-dimensional measurement device according to claim 1, wherein the measurement object is a printed circuit board on which solder paste is printed or a printed circuit board on which an adhesive is applied.

\* \* \* \* \*